United States Patent [19]
Robinson

[11] Patent Number: 5,729,634
[45] Date of Patent: Mar. 17, 1998

[54] DOCUMENT PROCESSING SYSTEM FOR ENHANCING HALFTONE IMAGES INCLUDING MULTIPLE CENTERED DOTS

[75] Inventor: David C. Robinson, Penfield, N.Y.

[73] Assignee: Xerox Corporation, Stamford, Conn.

[21] Appl. No.: 624,276

[22] Filed: Mar. 29, 1996

[51] Int. Cl.[6] .................................................. H04N 1/40
[52] U.S. Cl. ........................... 382/254; 358/459; 358/447; 358/298
[58] Field of Search ................................. 358/456, 447, 358/534, 532, 458, 459, 298, 455, 457; 382/266, 271, 275, 267, 254; 395/117, 109

[56] References Cited

U.S. PATENT DOCUMENTS

| | | | |
|---|---|---|---|
| 4,437,122 | 3/1984 | Walsh et al. | 358/447 |
| 4,847,641 | 7/1989 | Tung | 347/131 |
| 5,274,472 | 12/1993 | Williams | 358/455 |
| 5,329,599 | 7/1994 | Curry et al. | 382/266 |
| 5,404,233 | 4/1995 | Nagata et al. | 358/456 |
| 5,426,519 | 6/1995 | Banton | 358/533 |
| 5,467,422 | 11/1995 | Itihara et al. | 358/456 |
| 5,581,358 | 12/1996 | Seto et al. | 358/534 |

Primary Examiner—Edward L. Coles, Sr.
Assistant Examiner—Fan Lee
Attorney, Agent, or Firm—Gary B. Cohen

[57] ABSTRACT

A document processing system is provided for processing a job having one or more electronic pages with at least one of the electronic pages including a set of pixels defining a halftone image. Each pixel is disposed in one of a first state and a second state, and the set of pixels includes a plurality of dots with each dot including a group of one or more pixels disposed in the first state. The document processing system includes an image examination system for determining whether a first dot and a second dot exist within a selected subset of one of the one or more sets of pixels. When the image examination system determines that the first and second dots exist in the selected subset, the image examination system determines whether the first dot includes more or less pixels disposed in the first state than the second dot. The document processing system further includes an image manipulation system for adding a pixel portion to or subtracting a pixel portion from the first dot when it is determined, with the image examination system that the first and second dots exist in the selected subset and that the first dot includes more or less pixels disposed in the first state than the second dot.

12 Claims, 11 Drawing Sheets

DOCUMENT PROCESSING SYSTEM FOR ENHANCING HALFTONE IMAGES INCLUDING MULTIPLE CENTERED DOTS

BACKGROUND AND MATERIAL DISCLOSURE STATEMENT

This invention relates generally to a technique for processing halftone images and, more particularly, a document processing system for an image enhancement technique in which a partial pixel is added to or subtracted from a halftone image or dot for the sake of minimizing artifacts (e.g. contouring defects) resulting from the printing of a document with multiple centered dots.

Digital reproduction, transfer or display of original images on image output terminals begins by creating a digital representation of an original image. Commonly, the digital representation/becomes a two-tone microstructure otherwise known as a bitmap. In conventional halftoning, multiple gray levels or gray densities in the original image are reproduced by varying the amplitude within a fixed spatial frequency of halftone microstructures (or halftone cells/dots). Continuous tone images or image portions are typically represented in binary format by creating halftone cells or dots, where each cell represents a gray level density within an area of picture elements (pixels).

Methods of halftone digital image processing, encompassing the process steps of scanning or image acquisition through printing or display are known. In general, digital image output terminals (e.g. printers) are capable of creating spots within an area with a predetermined resolution (dots per unit area). In scanners, a single "spot" describes a multi-bit density response. Typically, input scanners may acquire density information at 256 levels of gray to describe a spot or pixel. By contrast, output terminals generally have two or another relatively small number of levels to reproduce image information. Output terminals commonly contend with excess scanned information by quantizing the image data through halftoning techniques, to represent the image as a halftone.

A continuing goal in the art is to develop output terminals, such as printers, with improved image quality. Physical constraints such as output terminal device resolution (spots per unit area) can be enhanced so as to increase perceived resolution without resorting to physical device resolution increases. Current technology improves device resolution without actually increasing dots per unit area. There are many advantages to increasing or controlling a printer's virtual (enhanced) resolution. The most evident advantage is a compatibility issue. Many printers have a physical resolution (or addressability) of 300 dots per inch (dpi), and by creating printers with greater physical resolutions such as 400 dpi, image emitters or document creators producing resolution dependent images at a particular resolution are no longer compatible. A solution to this problem is found by using device independent document (or image) descriptions such as Xerox Interpress and PostScript page description languages.

A further limitation of higher resolution devices is hardware affordability. Physical memory requirements increase when device resolution increases, directly increasing the cost of a physical device. As a result of increased memory requirements for higher resolution devices, technology enhancing physical device resolution limitations (virtual resolution) are desirable additions to the physical device.

High addressability techniques use laser modulation or pulse width modulation to increase printer resolution without modifying the physical printer device. Laser modulation uses a controller to modulate the appearance of the final output image. Printed spots of the output image may be moved, shrunk, or reshaped to achieve a variety of effects. High addressability methods affect the horizontal resolution. For example, doubling printer modulation rate results in doubling the horizontal resolution, while keeping vertical resolution unchanged. New and improved techniques to increase image resolution have improved halftone image quality. Specifically, in the field of digital halftoning, different methods of converting continuous tone to binary images while preserving the appearance of tonal gradation or density similar to the original image have been disclosed.

The following patent, the pertinent portions of which are incorporated herein by reference, discloses a method for transforming gray video input information, with an interpolation function, into a binary high addressability output representation for later manipulation on binary high addressability output terminals, such as printers and displays:

U.S. Pat. No. 5,274,472
Patentee: Williams
Issued: Dec. 28, 1993

In one approach to high addressability output printing, images are stored in the form of image data, the image data being represented by pixels. To increase horizontal resolution, each pixel is divided into M subpixels by a conventional enhancement technique. In turn, for purposes of printing the M subpixels, a modulator for a raster output scanner receives the M subpixels at a given clock rate and outputs a single bit stream, to a raster output scanner (ROS), at a rate of N times greater than the given clock rate.

Another technique that can be used in conjunction with high addressability printing to enhance document printability without altering the physical printer device is referred to as "template matching". As is known, template matching is well suited for precisely controlling the size, positioning and number of picture elements ("pixels") that are printed on xerographic photoreceptors to render bitmapped images. For example, template matching has been developed for reducing the severity of certain printing artifacts, such as the observable stairstep-like scan structure (commonly referred to as "jaggies") that sometimes degrades the xerographically printed appearance of non-vertical and non-horizontal lines. See Tung U.S. Pat. No. 4,847,641, which issued Jul. 11, 1989, on "Piece-wise Print Image Enhancement for Dot Matrix Printers" and Walsh et al. U.S. Pat. No. 4,437,122, which issued Mar. 13, 1984, on "Low Resolution Raster Images." Template matching effectively overcomes some of the sampling errors that are caused by the use of input data that is too coarse to accurately represent the higher spatial frequency content of the image.

Higher frequency dots are known to yield superior image quality since use of smaller dots, as opposed to large dots, to print images is more pleasing to the eye. It has been found that minimal image quality is obtained when 50 gray levels are provided for printed halftone images—using a smaller number of gray levels leads at a relatively high frequency has been found to result in contouring defects. For a 600 spi print engine, a double dot can be printed at a frequency of 106 dots per inch to obtain 64 gray levels. Essentially, multiple centered dots are used in printing at a relatively high frequency to create additional gray levels and thus provide results comparable to those obtained for single centered dots printed at relatively lower frequencies.

It has been found that multiple centered dots as printed on, for example, the DocuTech printing system (DocuTech is a registered trademark of Xerox Corporation) are not always equivalent in size since one of the dot centers may be larger than the other. To the consumer of the resulting hardcopy product, this can cause the appearance of lower frequencies. In particular, the eye loses the smaller dots and only comprehends the slightly larger ones since the eye can be quite sensitive to the asymmetry between the larger and smaller dot. It would be desirable to provide a technique, incorporating the advantageous aspects of template matching and high addressable printing, to compensate for the asymmetric growth encountered in the printing of certain multiple centered dots to eliminate artifacts and thus provide a pleasing appearance for all prints including multiple centered dots.

SUMMARY OF THE INVENTION

In one aspect of the invention, there is provided a document processing system for processing a job having one or more electronic pages with at least one of the electronic pages including a set of pixels defining a halftone image, each pixel being disposed in one of a first state and a second state, and the set of pixels including a plurality of dots with each dot including a group of one or more pixels disposed in the first state. The document processing system includes: a) an image examination system for determining whether a first dot and a second dot exist within a selected subset of one of the one or more sets of pixels; wherein when said image examination system determines that the first and second dots exist in the selected subset, said image examination system determines whether the first dot includes more or less pixels disposed in the first state than the second dot; and b) an image manipulation system for adding a pixel portion to or subtracting a pixel portion from the first dot when it is determined, with the image examination system that the first and second dots exist in the selected subset and that the first dot includes more or less pixels disposed in the first state than the second dot.

In another aspect of the present invention, there is provided a method for use with a document processing system for processing a job having one or more electronic pages with at least one of the electronic pages including a set of pixels defining a halftone image, each pixel being disposed in one of a first state and a second state, and the set of pixels including a plurality of dots with each dot including a group of one or more pixels disposed in the first state. The method includes the steps of: a) determining whether a first dot and a second dot exist within a selected subset of one of the one or more sets of pixels; b) when it is determined, with said a), that the first and second dots exist in the selected subset, determining whether the first dot includes more or less pixels disposed in the first state than the second dot; and c) when it is determined, with said a) and b), that the first and second dots exist in the selected subset and that the first dot includes more or less pixels disposed in the first state than the second dot, adding a pixel portion to or subtracting a pixel portion from the first dot.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
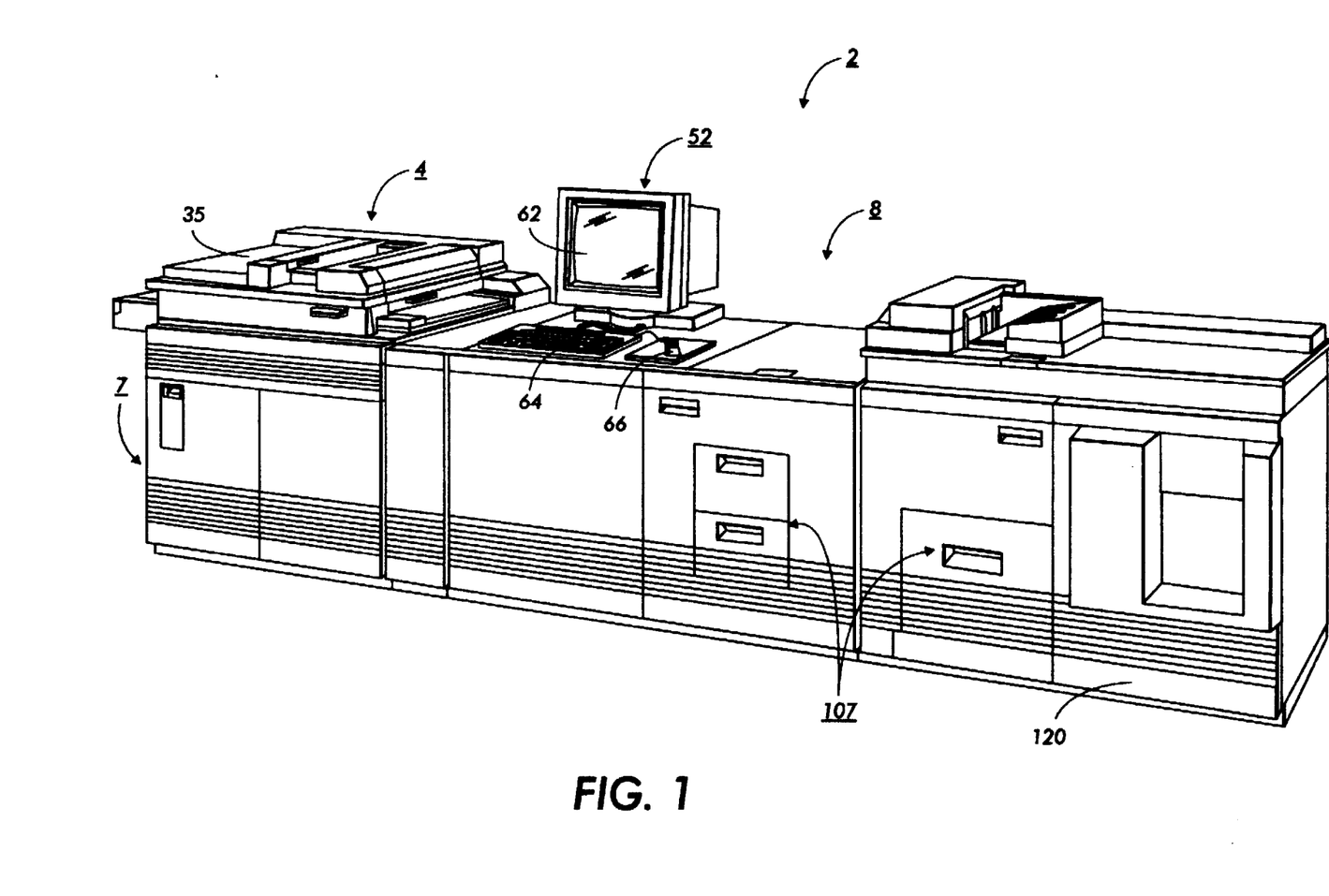
FIG. 1 is a view depicting an electronic printing system appropriate for implementing the document processing technique of the present invention.
Figure 2:
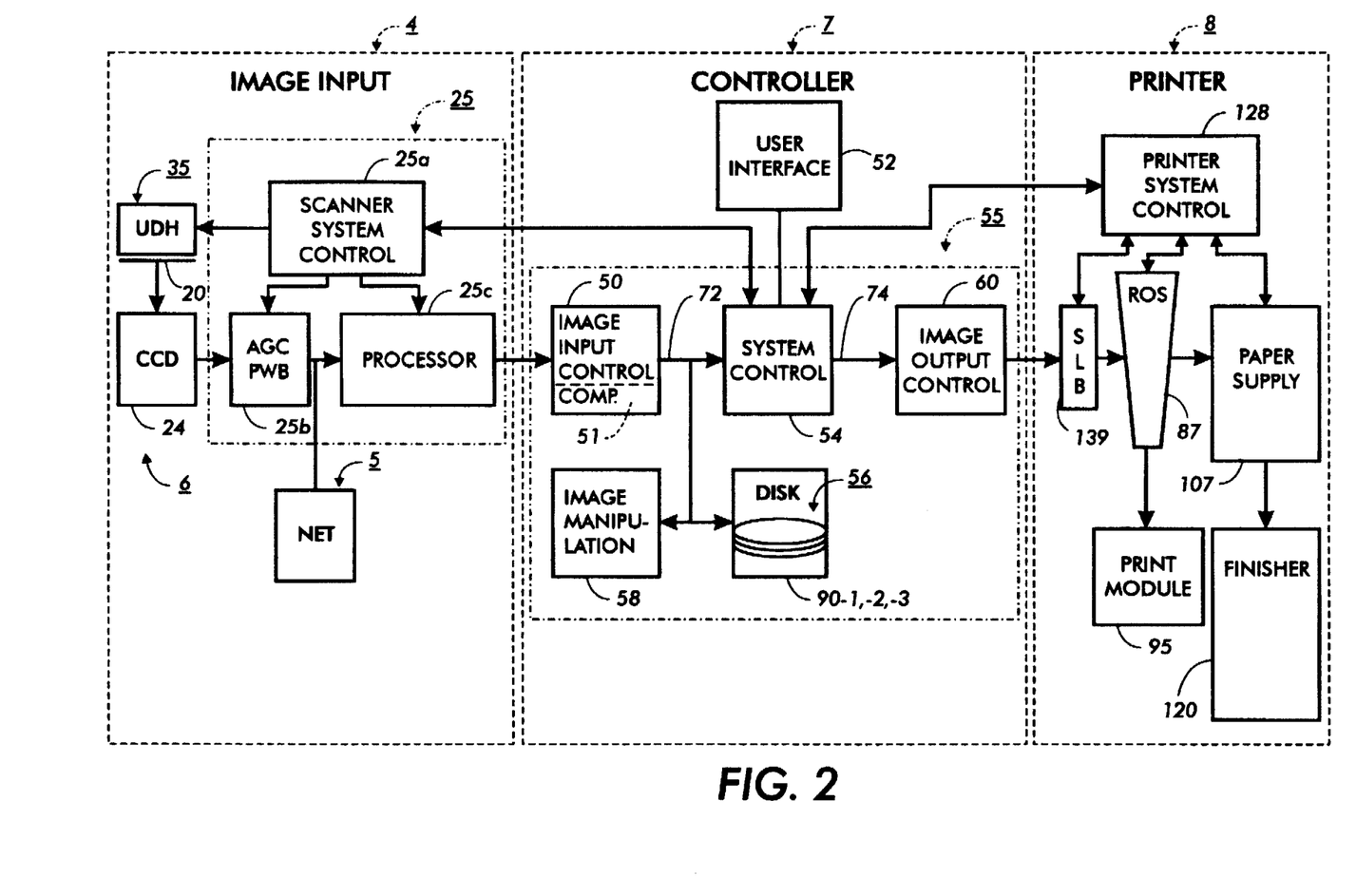
FIG. 2 is a block diagram depicting the major elements of the printing system shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 6) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Figure 3:
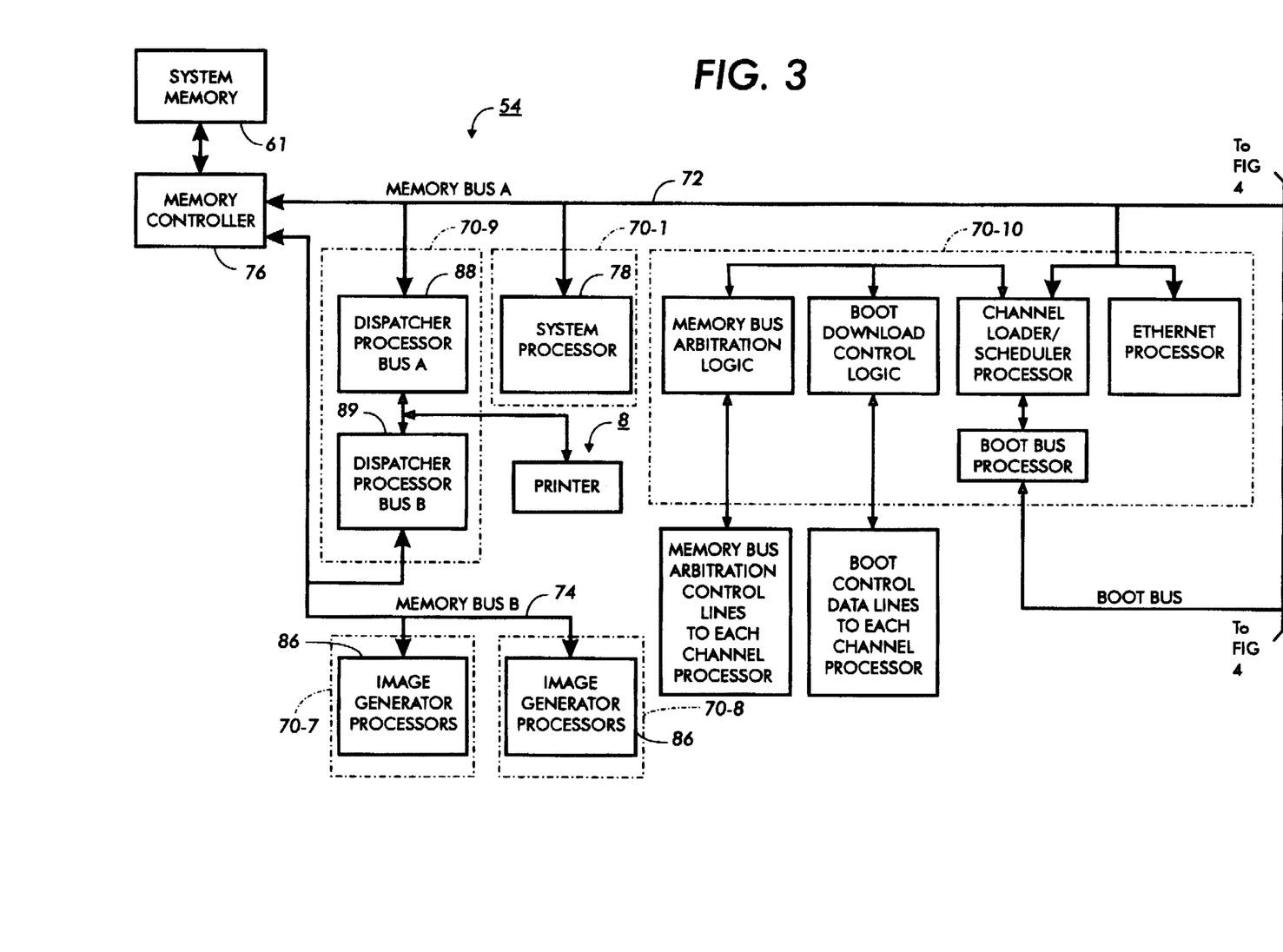
FIGS. 3-5 comprise a schematic block diagram showing the major parts of the control section for the printing system shown in FIG. 1.
Figure 4:
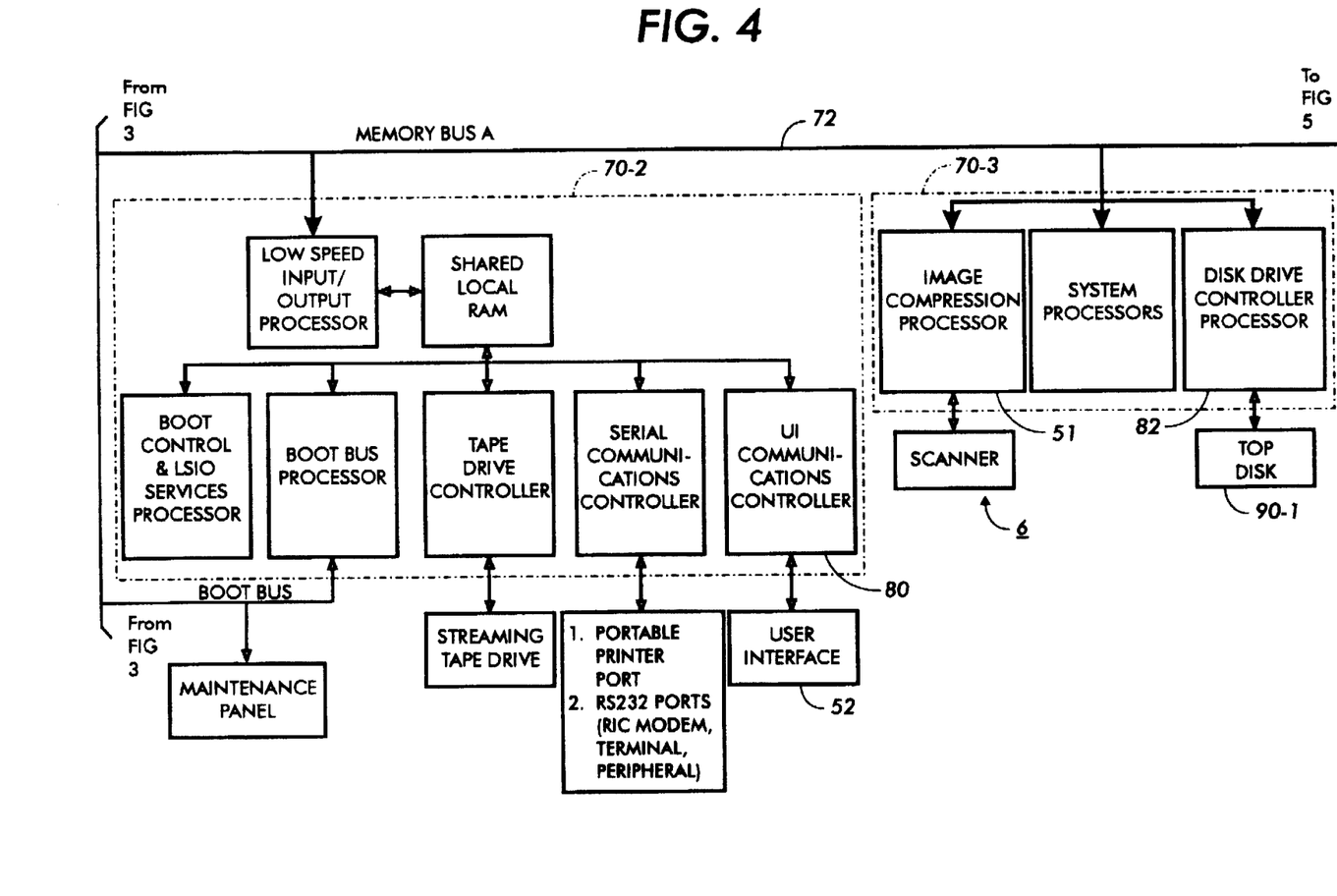
Figure 5:
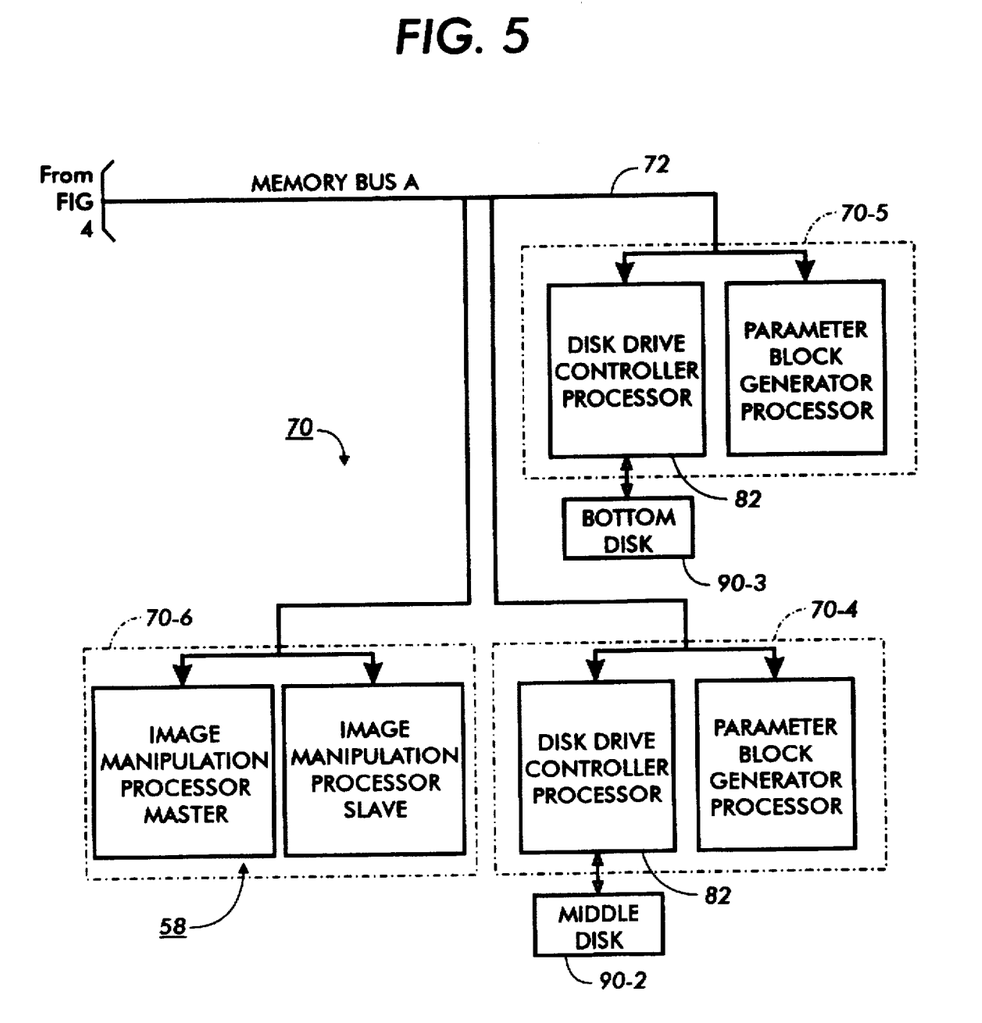

Referring particularly to FIGS. 3–5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3A–3C). PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controlled processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
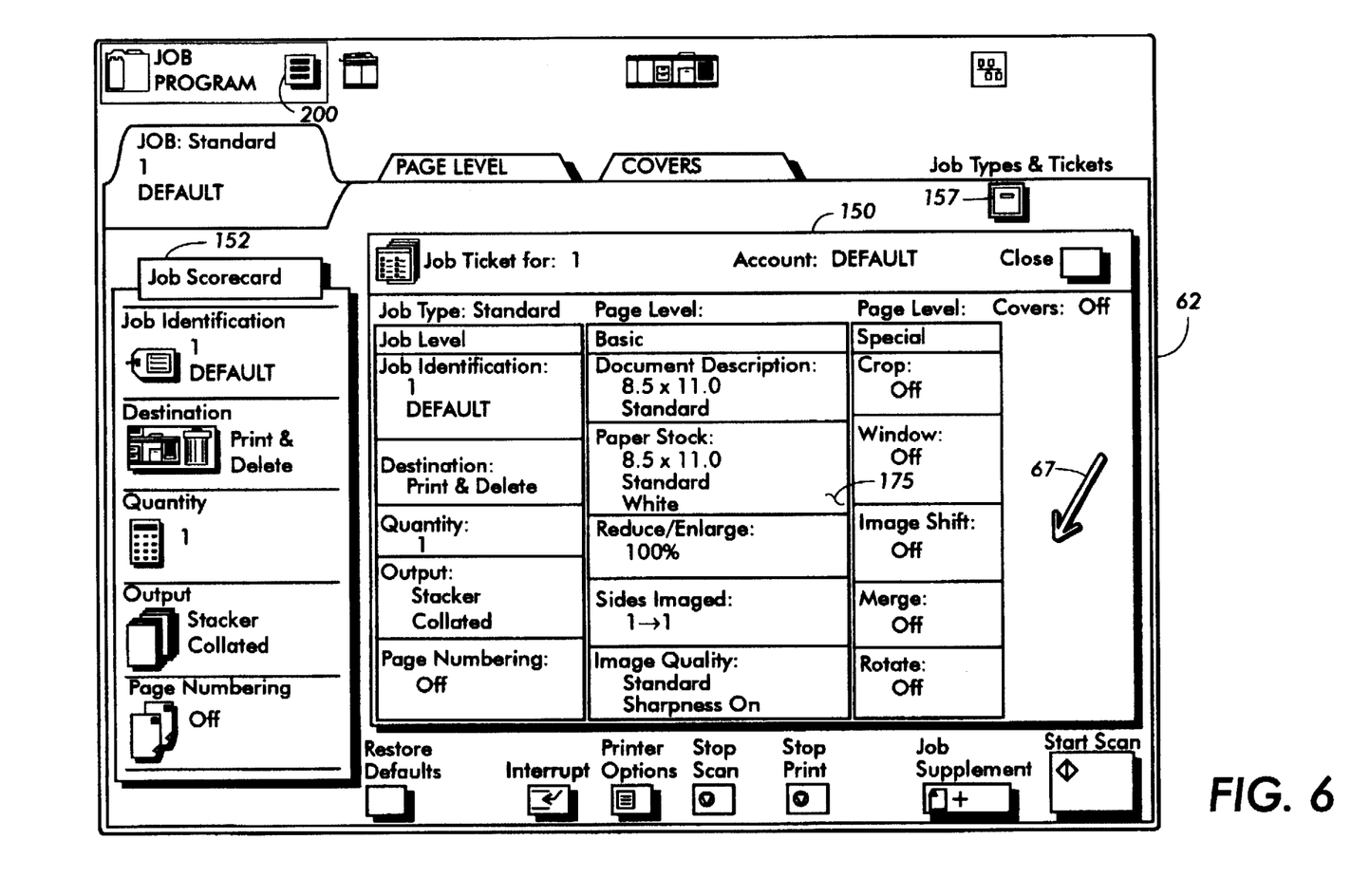
FIG. 6 is a view depicting an exemplary job programming ticket and job scorecard displayed on the User Interface (UI) touchscreen of the printing system shown in FIG. 1, the job ticket and job scorecard being associated with a job to be printed.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

Figure 7:
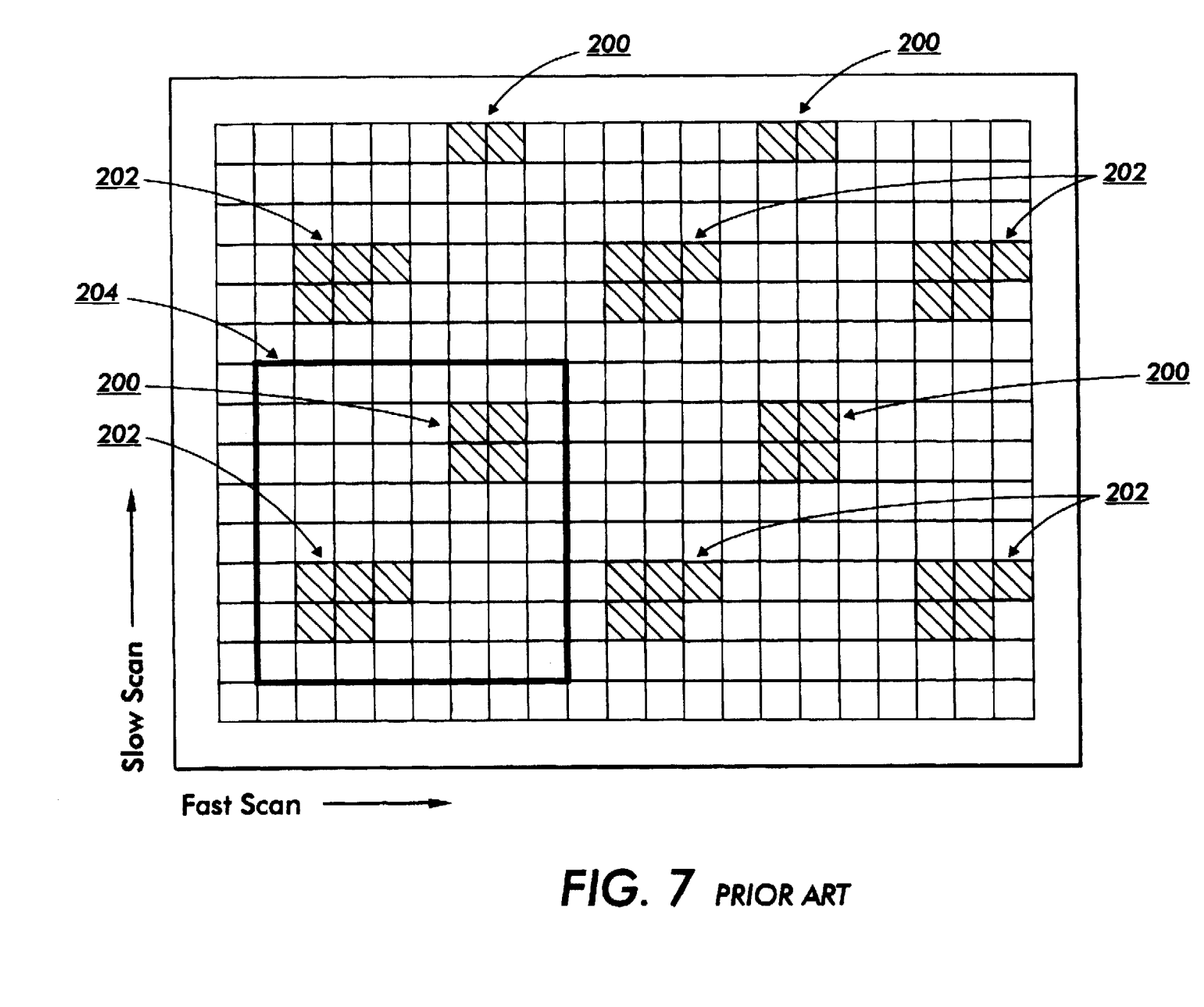
FIG. 7 is an elevational, blown up view of a print, including multiple centered dots, produced in accordance with a prior art printing technique.

Referring to FIG. 7, a partial, blown-up view of a print with halftone "dots" 200 and 202 is shown. In the illustrated embodiment of FIG. 7, a dot comprises one or more picture elements ("pixels") or halftone elements in an "on" (versus "off") state. As can be seen in the print of FIG. 7, two of the dots are grown in an area 204 with the area 204 including 64 gray levels. Examination of the area 204 permits an understanding of the problem addressed by the preferred embodiment. In particular, the human eye is directed toward the larger dot 202 rather than the smaller dot 200. Such attraction gives rise to artifacts, similar to contouring. It will be appreciated that the problem, in FIG. 7, is demonstrated with two dots in one area, but it is contemplated that the problem arises in those situations where more than two dots are grown in a given area.

Figure 8:
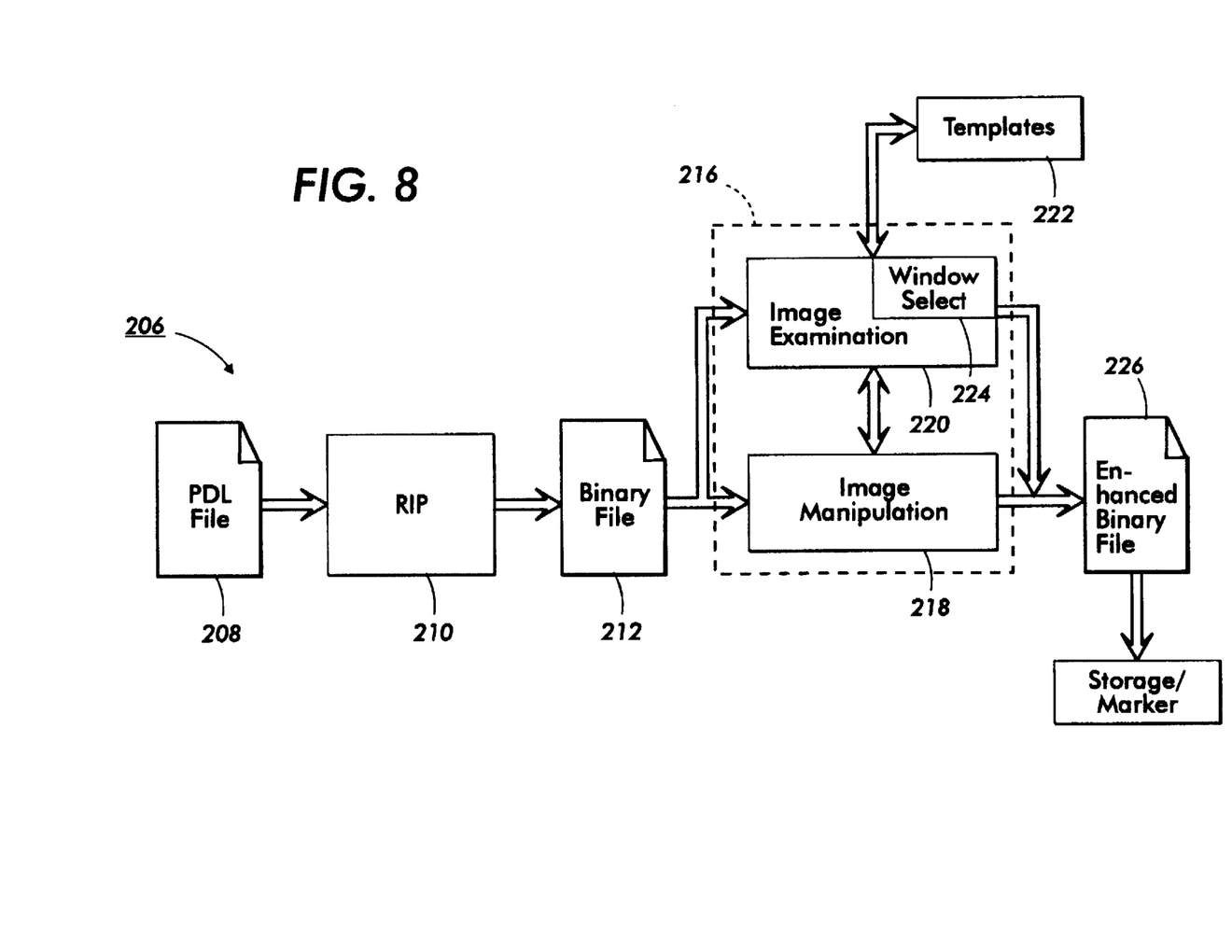
FIG. 8 is a block diagram of a system for producing prints, including multiple centered dots, produced in accordance with a technique embodying the present invention.

Referring to FIG. 8, a system capable of alleviating, if not eliminating, such artifacts is designated with the numeral 206. In the preferred system of FIG. 8, a file 208, including a document written in a suitable page description language, is decomposed or interpreted with a raster image processor ("RIP") 210, which processor, in one example, is a "pipelined" decomposer of the type disclosed in U.S. Pat. No. 5,493,634 to Bonk et al., the disclosure of which is incorporated herein by reference. It will be appreciated that the file further includes instructions for printing the document and, in one example, an indication as to what frequency should be used in producing prints for the document. Alternatively, the frequency for printing the document could be set at the RIP 210.

As a result of decomposing at RIP 210, the PDL file is reduced to primitives suitable for printing, with such primitives, in the illustrated embodiment of FIG. 8, being provided via a binary file 212. While the binary file 212 is shown in FIG. 8 as having its origin in the network (see FIG. 2), the binary file could have its origin in the scanner 6 without altering the basic concept upon which the preferred embodiment is based. Referring again to FIG. 7, without further processing, a binary file including multiple centered dots will, in some instances, print artifacts due to the presence of larger and smaller dots. Preferably, the binary file is processed, as required, with an image processing subsystem designated with the numeral 216. The binary file is communicated, in parallel to an image manipulation system 218 and an image examination subsystem 220. The image examination subsystem, which communicates with a template storage section 222, includes a hardware or software subsystem 224 for setting a window.

In general, the bitmap file, which may include one or more electronic pages, is delivered to the image processing subsystem 216 for examination by the image examination subsystem 220. In view of the examination, a pixel or halftone element of a given electronic page is delivered to the enhanced binary file 226 in either an unmanipulated form or with manipulation information developed by way of the image manipulation system 218. Further detailed discussion regarding the functionality of the image processing system 216 as well as the significance of the window and templates will appear below. Additionally, as will be appreciated by those skilled in the art, the image processing system 216 could be provided with software and implemented on a suitable platform, such as the image manipulation processor group 58 in FIG. 5, or in a firmware/hardware combination, such as an ASIC. Electronic page(s) passing through the image processing system 216 are communicated to the enhanced binary file 226 which is stored in memory, e.g. disk 90 (FIG. 2) or printed with the marker of the printer 8. At some time subsequent to processing the binary file 212 with the image processing system 216, the enhanced binary file 226 is placed in a form suitable for printing with a high addressability printer.

Figure 9:
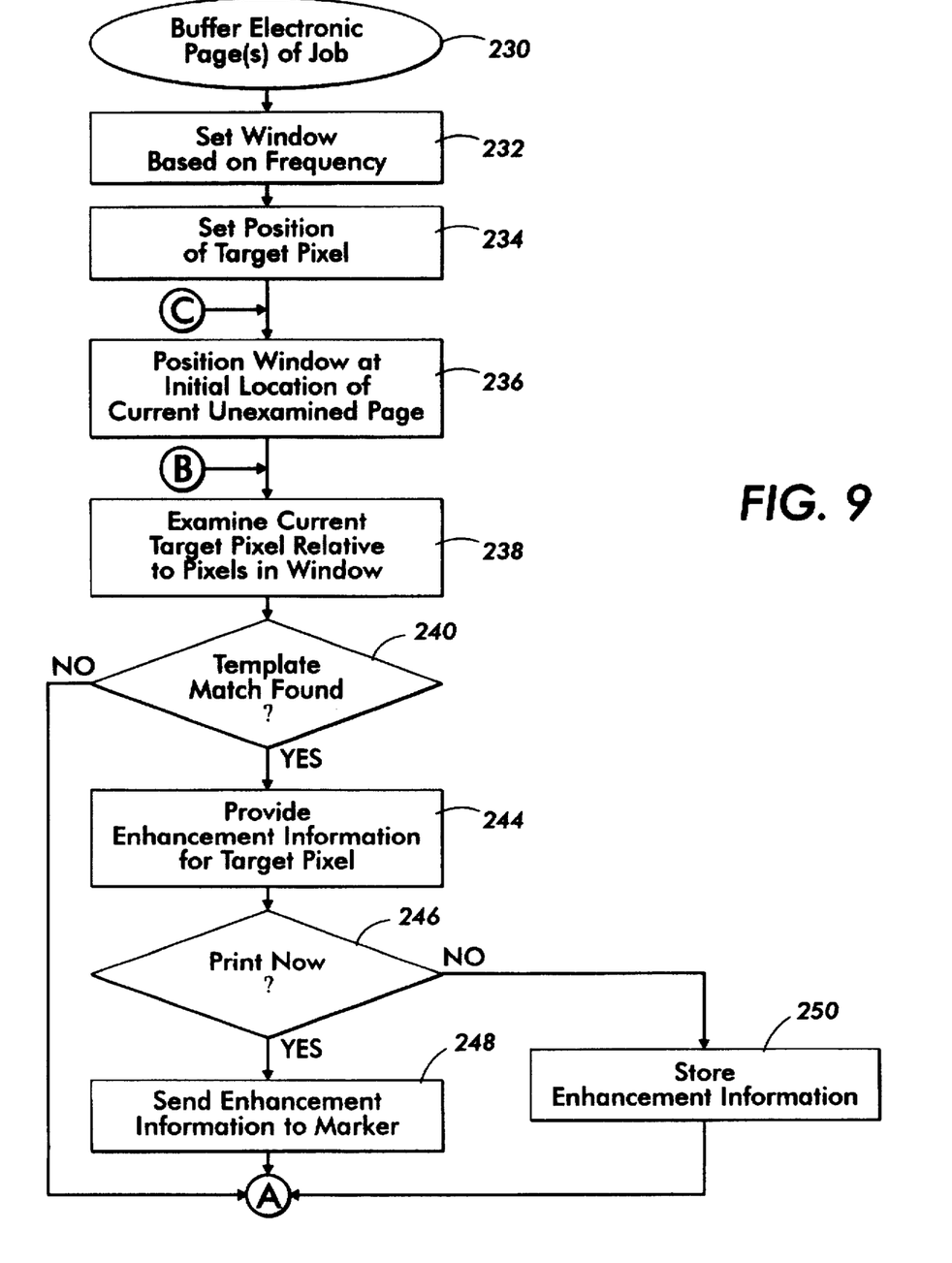
FIGS. 9 and 10 comprise a flow diagram representing one example of an implementation for use with the system of FIG. 8.
Figure 10:
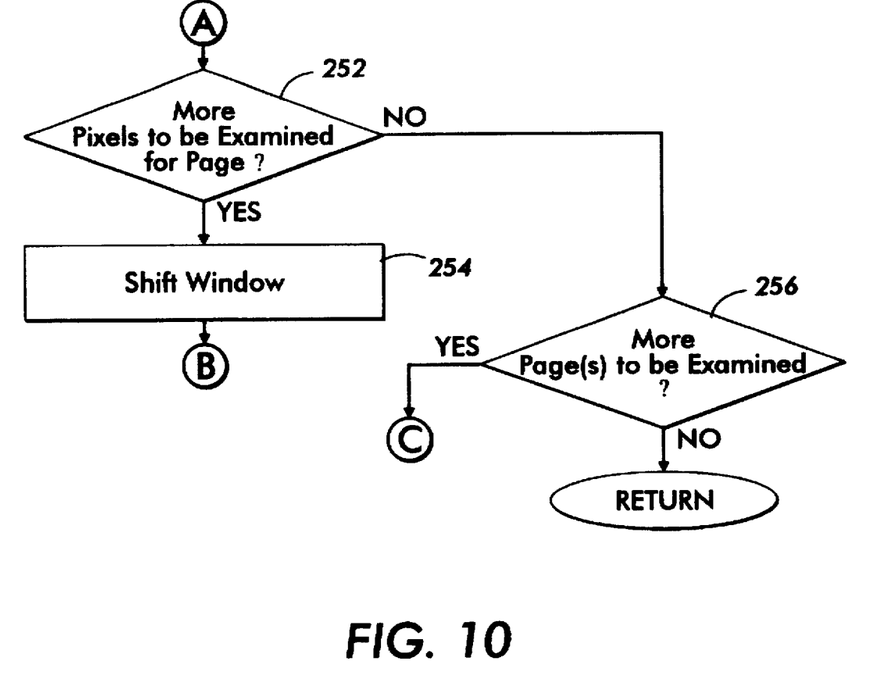

Referring to FIGS. 9 and 10, an exemplary implementation for use with the image processing system 216 is shown. At step 230, the electronic pages of a decomposed job are buffered in system memory 61 (FIG. 3) and the dimensions of the window 204 (FIG. 11A) are set, at step 232, for use with each of the buffered electronic pages. The window size in FIG. 11A affords for 64 gray levels, but in other examples, the size of the window would vary as a function of such factors as the frequency at which the electronic page is to be ultimately printed, the number of multiple centered dots to be grown in a given area, and the variance in printed gray levels represented by the multiple dots to be grown in a given area. After setting the window, which is preferably accomplished with the subsystem 224, a target pixel position within the window, for use in examining the electronic page, is set at step 234.

To begin examination of the first page, the window set with step 232 is, at step 236, positioned relative to the buffered page. Details regarding the application of window in an image processing context is provided by way of descriptions in U.S. Pat. No. 5,293,254 to Eschbach and U.S. Pat. No. 5,301,037 to Kang et al., the disclosures of which patents are incorporated herein by reference. With the window positioned, the pixel corresponding with the current target pixel is examined relative to the other pixels (step 238) within the window 204 (FIG. 11A) to determine, via step 240, if the relationship of the current target pixel corresponds with a template stored in memory. If the target pixel matches a template in memory, then enhancement information for use in printing that pixel is, by way of step 244, provided.

For those circumstances in which printing is imminent (see step 246), the enhancement information is buffered at the marker of the printer (step 248); otherwise the enhancement information is stored in mass memory for future printing (step 250). As illustrated by steps 252 and 254, if more pixels are to be examined in the electronic page, then the process loops back to step 238; otherwise, a check is made, at step 256 to determine if more electronic pages, requiring examination, exist. If more pages exist, then the process loops back to step 236 for resetting the position of the window. In the event that an entire job has been completed, a return to a main application is initiated.

Figure 11A:
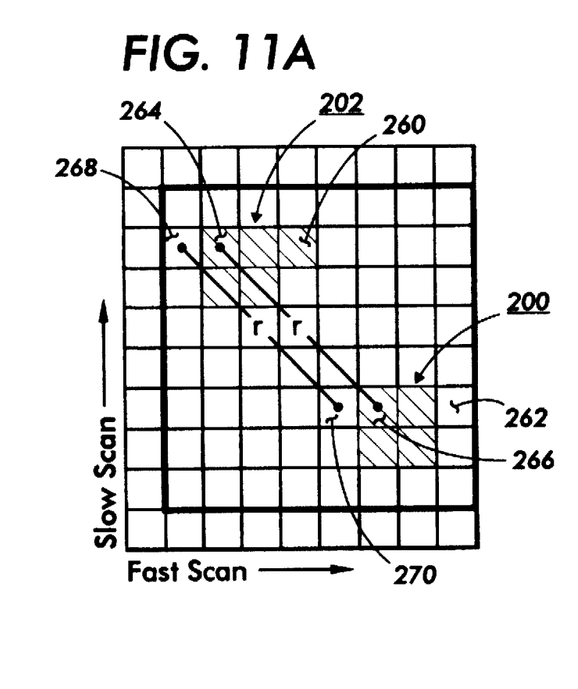
FIGS. 11A and 11B elevational views illustrating the manner in which multiple centered dots are manipulated in accordance with the technique embodying the present invention.
Figure 11B:
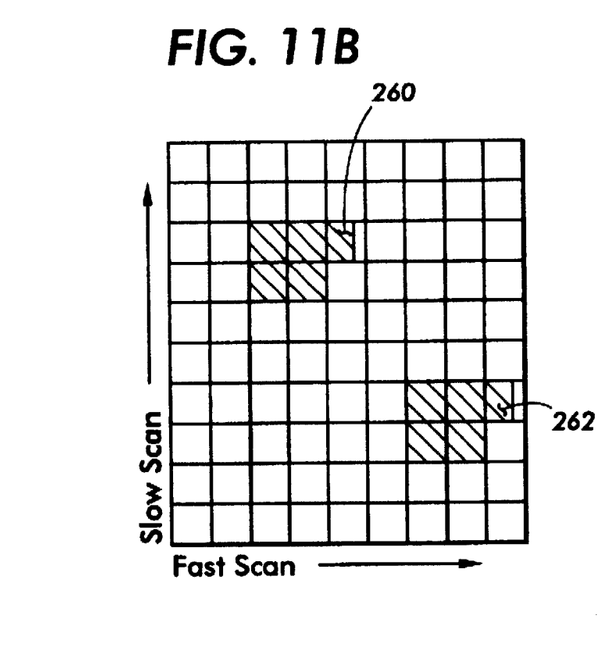

To more fully comprehend the process of FIGS. 9 and 10, reference is made to FIGS. 11A and 11B and more particularly to exemplary halftone elements 260 and 262. In FIG. 11A, all of halftone element 260 is turned on and all of halftone element 262 is turned off. In examining the relationship of halftone element 260 to the other halftone elements in the window 204, it is determined, by reference to a stored template, that only a portion of the halftone element 260 (e.g. a portion corresponding with a "half bit", see U.S. Pat. No. 5,333,249 to Klassen, the disclosure of which is incorporated herein by reference) should be printed—this information is either buffered or stored in accordance with the exemplary process discussed above. In examining the relationship of halftone element 262 to the other halftone elements in the window 204, it is determined, by reference to the stored template, that half of a halftone element should be printed—this information is either buffered or stored in accordance with the exemplary process discussed above. Accordingly, the dots of FIG. 11A are printed, with a high addressability printer, in the form of FIG. 11B.

It will be appreciated that while the process of FIGS. 9 and 10 illustrates an implementation in which a window is slid across or down a bitmap one pixel at a time, it is contemplated that in other arrangements the window would be slid a selected distance after providing enhancement information for two or more dots in a given area. To more fully comprehend such alternative approach, reference will be made to FIGS. 11A and 11B. In the alternative approach, the dots in the window are matched with one of the stored template and enhancement information is stored. Subsequently, the window is slid either eight pixels over or eight pixels down so that a check for another template match can be attemplated.

It will be further appreciated that the preferred method outlined in FIGS. 9 and 10 could be implemented without the use of a window. More particularly, for a given area each halftone element should correspond with another halftone element as a function of a predefined relationship. In one example, the predefined relationship requires that each turned on halftone element is within a distance of "r" of another turned on halftone element and each turned off halftone element is within r of another turned off halftone element. Referring to FIG. 11A, the turned on halftone element 264 is a distance "r" from the turned on halftone element 266, while the turned off halftone element 268 is a distance r from the turned off halftone element 270. It will be observed, however, that the above-described predefined relationship does not exist between halftone elements 260 and 262. Hence, in the embodiment which avoids windowing, the halftone elements 260, 262 are adjusted to provide the pattern of FIG. 11B.

Numerous features of the above-described embodiments can be appreciated by those skilled in the art:

First, a system and process, which minimizes image processing artifacts arising as a result of printing with multiple centered dots is provided. Multiple centered dots are grown at equal rates to eliminate artifacts and a print, which is pleasing to the eye, can be produced.

Second, the system and process maximizes productivity in that halftone generation is permitted with, for example, template matching prior to generating a high addressable printer bitmap.

Third, the system and process are particularly well suited for network applications.

Finally, the system and process are particularly flexible in that one of a variety of implementations can be employed to obtain the same desirable results. While, in one example template matching can be used to provide enhancement information for the high addressable printer bitmap(s), in another example the distance between halftone elements or pixels in a given area can be used to determine if the enhancement information is to be provided.

I claim:

1. A document processing system for processing a job having one or more electronic pages with at least one of the electronic pages including a set of pixels defining a halftone image, each pixel being disposed in one of a first state and a second state, and the halftone image including a plurality of halftone areas with each halftone area including a first dot having one or more pixels disposed in the first state and a second dot having one or more pixels disposed in the first state, comprising:

a) an image examination system for examining each of the plurality of halftone areas to determine whether the first dot includes more or less pixels disposed in the first state than the second dot; and b) an image manipulation system for,
  i) adding a first pixel portion to the first dot and subtracting a second pixel portion from the second dot when it is determined, with said image examination system, that the first dot includes at least one pixel disposed in the first state than the second dot, wherein a size of the second pixel portion varies as a function of a size of the first pixel portion, and
  (ii) subtracting a third pixel portion from the first dot and adding a fourth pixel portion to the second dot when it is determined, with said image examination system, that the second dot includes at least one pixel disposed in the first state than the first dot, wherein a size of the third pixel portion varies as a function of a size of the fourth pixel portion, wherein a disparity in size between the first and second dots is alleviated.

2. The document processing system of claim 1, in which each of the halftone areas includes M×N pixels and one of the pixels within the first dot is designated as a target pixel, wherein the target pixel is examined relative to other pixels in the M×N pixels to determine whether the first dot includes at least one more pixel disposed in the first state than the second dot.

3. The document processing system of claim 2, in which a plurality of templates is accessible by the document processing system, further comprising a template matching system for determining whether a selected relationship exists between the target pixel and the other pixels within the halftone areas by reference to one of the stored templates.

4. The document processing system of claim 2, in which the target pixel is in the first state and said image examining system determines whether a pixel both disposed in the first state and located a selected distance from the target pixel exists in the second dot.

5. The document processing system of claim 1, in which a portion of the job is expressed in a page description language and is transmitted across a network, further comprising:

c) a raster image processing system for placing the job in a preliminary condition for printing prior to examining the job with said image examining system.

6. The document processing system of claim 5, in which the halftone image is printed at a selected frequency, wherein said raster image processing system refers to the selected frequency for facilitating the placing of the job in the preliminary condition for printing.

7. In a document processing system for processing a job having one or more electronic pages with at least one of the electronic pages including a set of pixels defining a halftone image, each pixel being disposed in one of a first state and a second state, and the halftone image including a plurality of halftone areas with each halftone area including a first dot having one or more pixels disposed in the first state and a second dot having one or more pixels disposed in the first state, a method comprising:

a) examining each of the plurality of halftone areas to determine whether the first dot includes more or less pixels disposed in the first state than the second dot; and    b) selectively manipulating the plurality of halftone areas by,       (i) adding a first pixel portion to the first dot and subtracting a second pixel portion from the second dot when it is determined, with said (a), that the first dot includes at least one more pixel disposed in the first state than the second dot, wherein a size of the second pixel portion varies as a function of a size of the first pixel portion, and       (ii) subtracting a third pixel portion from the first dot and adding a fourth pixel portion to the second dot when it is determined, with said (a), that the second dot includes at least one more pixel disposed in the first state than the first dot, wherein a size of the third pixel portion varies as a function of a size of the fourth pixel portion wherein a disparity in size between the first and second dots is alleviated.

8. The method of claim 7, in which each of the halftone areas includes M×N pixels and one of the pixels within the first dot is designated as a target pixel, wherein said b) includes examining the target pixel relative to other pixels in the M×N pixels to determine whether the first dot includes at least one more pixel disposed in the first state than the second dot.

9. The method of claim 8, in which a plurality of templates is stored in the document processing system, wherein said examining includes determining whether a selected relationship exists between the target pixel and the other pixels within the halftone areas by reference to one of the stored templates.

10. The method of claim 8, in which the target pixel is in the first state and said examining includes determining whether a pixel both disposed in the first state and located a selected distance from the target pixel exists in the second dot.

11. The method of claim 7, in which a portion of the job is both expressed in a page description language and transmitted across a network to a raster image processing system for placing the job in a condition for printing, further comprising:

c) placing the job in the condition for printing, with the raster image processing system prior to performing said (a) and (b).

12. The method of claim 11, in which the halftone image is printed at a selected frequency, wherein said c) includes using the selected frequency to facilitate said placing of the job in the condition for printing.

* * * * *